United States Patent
Nádas et al.

(10) Patent No.: US 12,206,590 B2
(45) Date of Patent: Jan. 21, 2025

(54) PACKET PROCESSING IN A COMPUTING DEVICE USING MULTIPLE TABLES

(71) Applicant: Telefonaktiebolaget LM Ericsson (publ), Stockholm (SE)

(72) Inventors: Szilveszter Nádas, Santa Clara, CA (US); Sándor Laki, Budapest (HU); Gergő Gombos, Budapest (HU); Ferenc Fejes, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/286,871

(22) PCT Filed: Mar. 23, 2022

(86) PCT No.: PCT/IB2022/052656
§ 371 (c)(1),
(2) Date: Oct. 13, 2023

(87) PCT Pub. No.: WO2022/238773
PCT Pub. Date: Nov. 17, 2022

(65) Prior Publication Data
US 2024/0195747 A1    Jun. 13, 2024

Related U.S. Application Data

(60) Provisional application No. 63/186,356, filed on May 10, 2021.

(51) Int. Cl.
| H04L 47/28 | (2022.01) |
| H04L 47/12 | (2022.01) |
| H04L 47/31 | (2022.01) |

(52) U.S. Cl.
CPC .............. *H04L 47/28* (2013.01); *H04L 47/12* (2013.01); *H04L 47/31* (2013.01)

(58) Field of Classification Search
CPC .......... H04L 47/28; H04L 47/12; H04L 47/31
See application file for complete search history.

(56) References Cited

U.S. PATENT DOCUMENTS

| 11,695,703 B2 * | 7/2023 | Nádas | ................. H04L 47/31 370/235.1 |
| 2022/0224652 A1 * | 7/2022 | Nádas | ................. H04L 47/31 |

(Continued)

FOREIGN PATENT DOCUMENTS

| WO | 2019034996 A1 | 2/2019 |
| WO | 2019141380 A1 | 7/2019 |

(Continued)

OTHER PUBLICATIONS

S. Nadas, Z. Turanyi, G. Gombos and S. Laki, "Stateless Resource Sharing in Networks with Multi-Layer Virtualization," ICC 2019—2019 IEEE International Conference on Communications (ICC), Shanghai, China, 2019, pp. 1-7 (Year: 2019).*

(Continued)

*Primary Examiner* — David R Lazaro
(74) *Attorney, Agent, or Firm* — COATS & BENNETT, PLLC

(57) ABSTRACT

A computing device (110) receives a packet comprised in a flow, and uses a region index table (310) to identify a first region of a Throughput-Value Function, TVF (400), based on a flow rate of the flow. The first region is one of a plurality of sequentially ordered regions across an input domain of the TVF (400). The computing device (110) randomly selects one of a plurality of preconfigured offset values to identify a second region of the TVF (400) that is lower than the first region of the TVF (400) by the randomly selected offset value. The computing device (110) determines a packet value using a TVF table (330) that maps each of the regions to a respective one of a plurality of packet values. The packet value is mapped to the second region. The (Continued)

computing device (110) marks the packet with the packet value mapped to the second region.

17 Claims, 9 Drawing Sheets

(56) References Cited

U.S. PATENT DOCUMENTS

| | | | | |
|---|---|---|---|---|
| 2024/0106758 A1* | 3/2024 | Nádas et al. | ............ | H04L 47/31 |
| 2024/0195747 A1* | 6/2024 | Nádas et al. | ............ | H04L 47/31 |

FOREIGN PATENT DOCUMENTS

| | | |
|---|---|---|
| WO | 2020229905 A1 | 11/2020 |
| WO | 2022153105 A1 | 7/2022 |

OTHER PUBLICATIONS

S. Nadas, Z. R. Turanyi and S. Racz, "Per Packet Value: A Practical Concept for Network Resource Sharing," 2016 IEEE Global Communications Conference (GLOBECOM), Washington, DC, USA, 2016, pp. 1-7 (Year: 2016).*

Szilveszter Nádas, Gergő Gombos, Ferenc Fejes, and Sándor Laki. 2019. Towards core-stateless fairness on multiple timescales. In Proceedings of the 2019 Applied Networking Research Workshop (ANRW '19). Association for Computing Machinery, New York, NY, USA, 30-36. (Year: 2019).*

Nadas et al., "Per Packet Value: A Practical Concept for Network Resource Sharing", Conference Paper, Globecom, Dec. 2016, pp. 1-7, IEEE.

Laki et al., "Core-Stateless Forwarding With QoS Revisited: Decoupling Delay and Bandwidth Requirements", Journal, IEEE/ACM Transactions on Networking, Apr. 2021, pp. 503-516, vol. 29 No 2., IEEE.

* cited by examiner

PACKET PROCESSING IN A COMPUTING DEVICE USING MULTIPLE TABLES

RELATED APPLICATIONS

This application claims priority to U.S. Application No. 63/186,356 filed 10 May 2021, disclosure of which is incorporated in its entirety by reference herein.

TECHNICAL FIELD

This application generally relates to the field of computer networking, and more particularly relates to packet processing performed by a computing device in a computer network.

BACKGROUND

The Per Packet Value (PPV) method of per packet marking generally provides a mechanism for controlling the sharing of bandwidth in a communication network. In general, each packet is given a label that expresses its importance. The label is provided by a marker node at the network edge. This label is referred to as a Packet Value (PV).

To generate the PV, the marker node uses a random number between zero and a measured throughput rate as input to a Throughput-Value Function (TVF). The TVF produces the PV from this bounded random number input. Once packets have been marked with an appropriate PV, bottlenecked nodes may then use these PV values to make bandwidth sharing decisions. The different packets of a flow can have different PVs. For example, in case of congestion, packets with PVs that indicate the lowest importance will be dropped first.

The first switches equipped with the next generation of programmable Application-Specific Integrated Circuits (ASICs) were announced and sold in recent years. These ASICs (like Barefoot Tofino) implement the Protocol Independent Switching Architecture (PISA) model and can be programmed using the P4 programming language. They generally provide high flexibility in describing data plane pipelines without sacrificing packet processing performance.

Notwithstanding these advancements, these ASICs continue to be limited in many respects. For example, in many cases, certain operations may be unsupported or simply too computationally expensive to perform with any degree of regularity. These limitations have traditionally frustrated efforts toward implementing PPV within the network.

SUMMARY

Embodiments of the present disclosure are generally directed to solutions that enable efficient packet marking. One or more embodiments include a method implemented by a computing device. The method comprises receiving a packet comprised in a flow. The method further comprises using a region index table to identify a first region of a Throughput-Value Function, TVF, based on a flow rate of the flow. The first region is one of a plurality of sequentially ordered regions across an input domain of the TVF. The method further comprises randomly selecting one of a plurality of preconfigured offset values to identify a second region of the TVF that is lower than the first region of the TVF by the randomly selected offset value. The method further comprises determining a packet value using a TVF table that maps each of the regions to a respective one of a plurality of packet values. The packet value is mapped to the second region. The method further comprises marking the packet with the packet value mapped to the second region.

In some embodiments, the region index table maps one or more flow rates to each of the regions of the TVF.

In some embodiments, each of the preconfigured output values is mapped by an offset value table to a respective unique value in a range of unique values. Further, randomly selecting the one of the plurality of preconfigured offset values comprises randomly selecting one of the unique values and using the randomly selected one of the unique values as an index into the offset value table to obtain the one of the plurality of preconfigured offset values. In some such embodiments, a cardinality of the range of unique values is a power of two.

In some embodiments, a maximum of the input domain of the TVF is a maximum supported throughput of a network via which the packet is received.

In some embodiments, the sequentially ordered regions are of exponentially increasing size.

In some embodiments, the TVF table maps each of the regions to the respective one of the plurality of packet values for each of a plurality of policies. The method further comprises identifying a policy in the plurality of policies associated with the flow for use in referencing the TVF table when determining the packet value.

In some embodiments, the TVF table is one of a plurality of TVF tables, each of which is associated with a respective one of a plurality of policies. The method further comprises identifying which of the plurality of TVF tables corresponds to a policy associated with the flow.

Other embodiments include a computing device configured to receive a packet comprised in a flow. The computing device is further configured to use a region index table to identify a first region of a Throughput-Value Function, TVF, based on a flow rate of the flow. The first region is one of a plurality of sequentially ordered regions across an input domain of the TVF. The computing device is further configured to randomly select one of a plurality of preconfigured offset values to identify a second region of the TVF that is lower than the first region of the TVF by the randomly selected offset value. The computing device is further configured to determine a packet value using a TVF table that maps each of the regions to a respective one of a plurality of packet values. The packet value is mapped to the second region. The computing device is further configured to mark the packet with the packet value mapped to the second region.

In some embodiments, the computing device is further configured to perform any one of the methods described above.

In some embodiments, the computing device comprises processing circuitry and a memory. The memory contains instructions executable by the processing circuitry whereby the computing device is configured.

In particular, the processing circuitry is configured to receive a packet comprised in a flow. The processing circuitry is further configured to use a region index table to identify a first region of a Throughput-Value Function, TVF, based on a flow rate of the flow, the first region being one of a plurality of sequentially ordered regions across an input domain of the TVF. The processing circuitry is further configured to randomly select one of a plurality of preconfigured offset values to identify a second region of the TVF that is lower than the first region of the TVF by the randomly selected offset value. The processing circuitry is further configured to determine a packet value using a TVF table that maps each of the regions to a respective one of a plurality of packet values. The packet value is mapped to the second region. The processing circuitry is further configured to mark the packet with the packet value mapped to the second region.

In some embodiments, the processing circuitry is further configured to perform any one of the methods described above.

Other embodiments include a computer program comprising instructions which, when executed on processing circuitry of a computing device, cause the processing circuitry to carry out any one of the methods described above.

Other embodiments include a carrier containing said computer program. The carrier is one of an electronic signal, optical signal, radio signal, or computer readable storage medium.

BRIEF DESCRIPTION OF THE DRAWINGS

Aspects of the present disclosure are illustrated by way of example and are not limited by the accompanying figures with like references indicating like elements. In general, the use of a reference numeral should be regarded as referring to the depicted subject matter according to one or more embodiments, whereas discussion of a specific instance of an illustrated element will append a letter designation thereto (e.g., discussion of a terminal 120, generally, as opposed to discussion of particular instances of terminals 120a, 120b).

DETAILED DESCRIPTION

Figure 1:
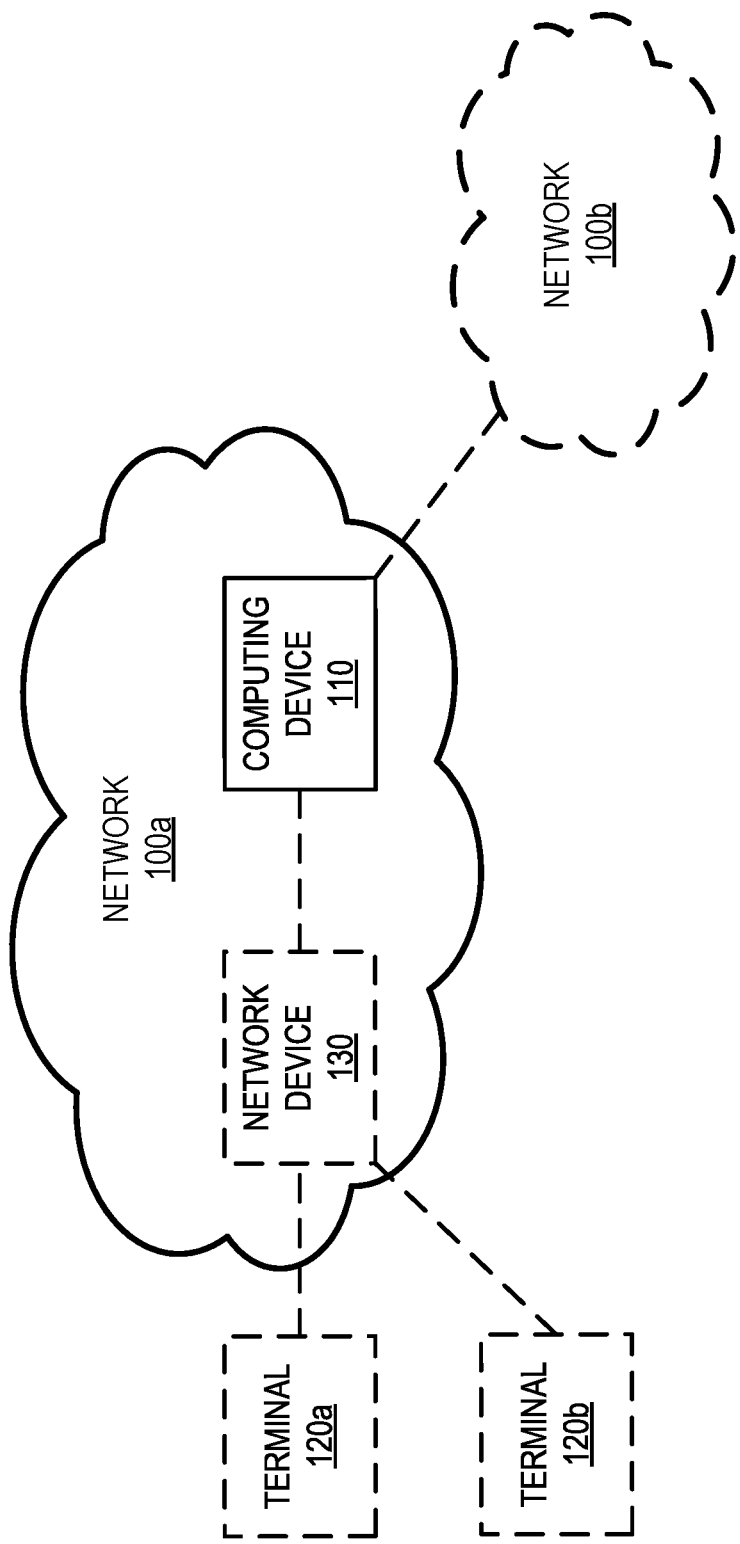
FIG. 1 is a schematic diagram illustrating an example network, according to one or more embodiments of the present disclosure.

The embodiments described herein may be implemented on a computing device 110 in a communication network 100a that marks packets with PVs, as illustrated in the example of FIG. 1. In the particular example of FIG. 1, the computing device 110 is a switch at the edge of network 100a. Alternatively, the computing device 110 may comprise a Core Stateless Active Queue Management (CSAQM) router that manages resource sharing for at least some of the network 100a. In this regard, the computing device 110 may be located at any appropriate location in the network 100a. In one particular example, the computing device 110 may mark packets on a domain border, at an access point, and/or at a gateway of the network 100a. In other examples, the computing device 110 may be elsewhere in the network 100a.

In some embodiments, the computing device 110 may mark packets of flows upon ingress to and/or egress from the network 100a. For example, the computing device 110 may mark packets received from another network 100b (e.g., the Internet) communicatively connected to the network 100a via the computing device 110 for use by a network device 130. The network device 130 (e.g., a gateway, router, switch, application server) may use the PV of marked packets destined for terminals 120a, 120b to make resource (e.g., bandwidth) sharing decisions. For example, packets in flows destined for terminal 120a may have a higher drop precedence than packets in flows destined for terminal 120b, as indicted by their PV.

It will be appreciated that although FIG. 1 depicts only a single network device 130 between the terminals 120a, 120b, other embodiments may include one or more other network devices 130 that may be in parallel or in series between the terminals 120a, 120b. Further, other embodiments may support any number of terminals 120 or none at all. For example, the endpoints of flows through the computing device 110 may be one or more server devices (e.g., network device 130) within the network 100a. In some embodiments, the terminals 120a, 120b may be subscribers to the network 100a. In some embodiments, the network 100a comprises multiple operator networks, each comprising their own network devices via which the terminals 120a, 120b may exchange traffic, to which any of the terminals 120 may subscribe.

Each flow through the computing device 110 comprises one or more packets. The packets may be any of a variety of different types. Examples of the most common types of packets 180 include Internet Protocol (IP) packets (e.g., Transmission Control Protocol (TCP) packets, User Datagram Protocol (UDP) packets), Multiprotocol Label Switching (MPLS) packets, and/or Ethernet packets. Among other things, the packets may comprise one or more fields for storing values used by the network 100a in performing packet processing (e.g., deciding whether to forward, queue, or drop packets). These fields may be in either a header or payload section of the packet, as may be appropriate. The computing device 110 and/or network device 130 may, in some embodiments, schedule the marked packets for transmission based on their PV.

Figure 2:
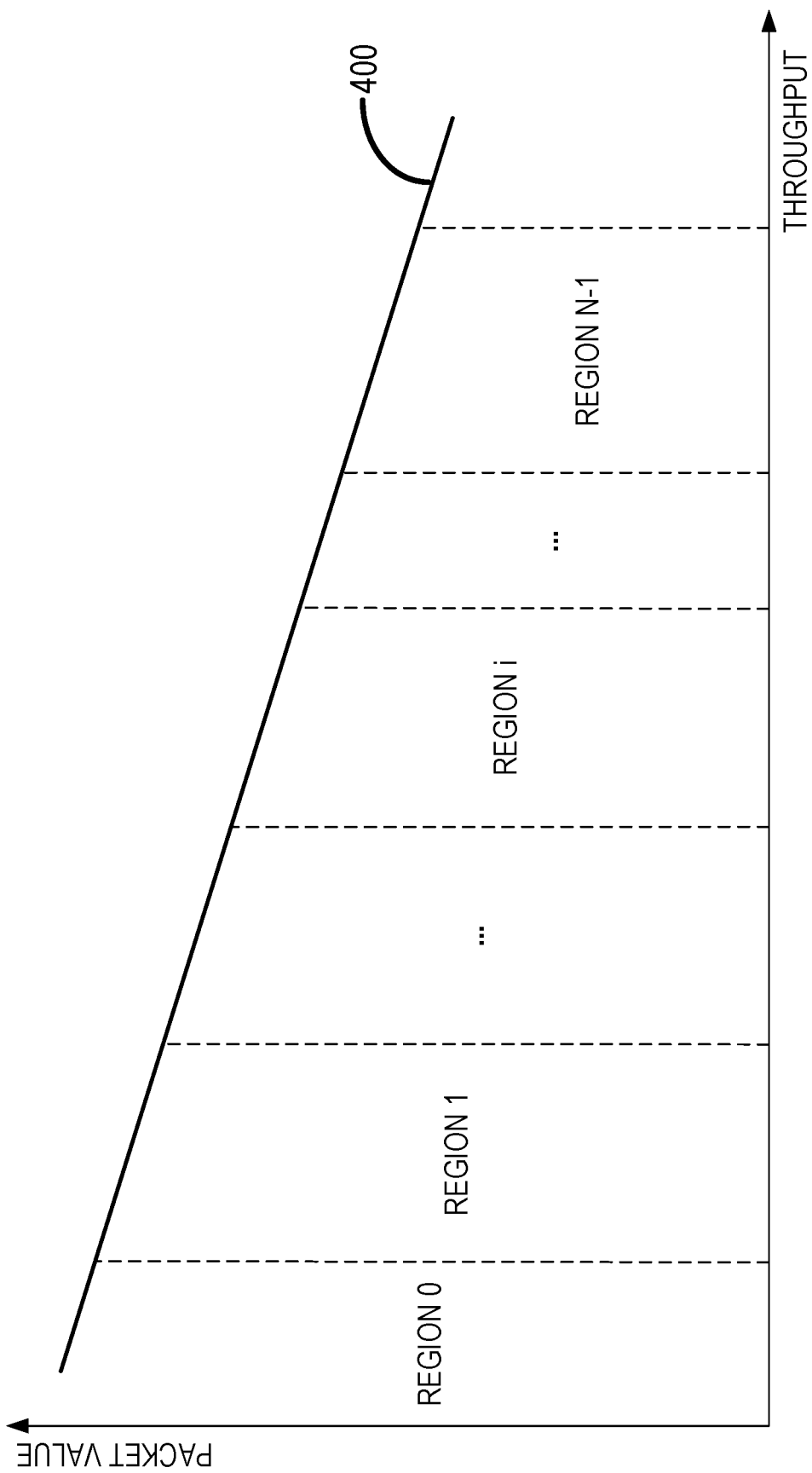
FIG. 2 is a schematic diagram illustrating an example of a TVF, according to one or more embodiments of the present disclosure.

In general, the computing device 110 marks packets in accordance with a TVF. An example of a TVF 400 in accordance with one or more embodiments is illustrated in FIG. 2. The TVF 400 takes a throughput (e.g., bit rate) as an input and produces a PV as a function of the throughput. The TVF 400 used in PPV packet marking may calculate a PV in a variety of different ways, depending on the particular embodiment. Random number generation, logarithmic calculation, and division, are among the types of operations that may be used to calculate a PV, for example.

Certain existing programmable switches are currently limited in the types of operations they can perform, which currently impairs their ability to implement certain TVFs 400. The (e.g., Intel® Tofino™ series switches, for example, currently do not support logarithmic calculation and division. Some switches additionally or alternatively support random number generation only between zero and a fixed power of two. Moreover, the programming language used for programming such switches (e.g., P4) may additionally or alternatively have such support limitations. Because programmable switches can often run only a limited number of operations, implementing a TVF 400 in such an environment can be quite challenging.

In order to effectively implement PPV in an environment that may lack robust support for certain computationally complex operations (e.g., in a programmable switch), embodiments of the present disclosure use a table-based approach to implement, e.g., random number generation, a TVF 400, and/or other PPV procedures. Given that such embodiments may make use of more computationally inexpensive procedures, such embodiments may additionally or alternatively be useful even in environments where more traditional operations are available or supported due to their computational efficiency.

To facilitate computational simplification and/or compatibility of TVF calculations, particular embodiments of the present disclosure implement a TVF 400 by dividing the range of acceptable throughput input values into N regions having indices 0 through N-1, as shown in FIG. 2. The regions are used to assist in identifying other values used in the calculation of PVs, as will be explained in greater detail below.

Figure 3:
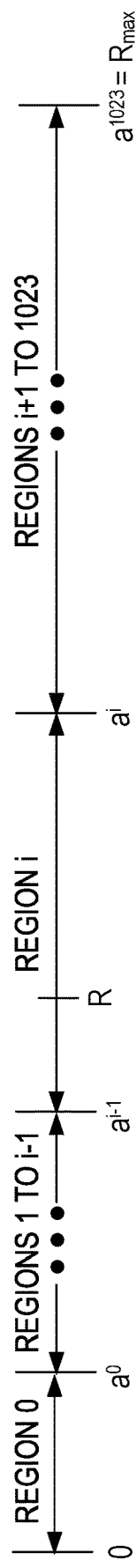
FIG. 3 is a schematic diagram illustrating example regions across an input domain of a TVF, according to one or more embodiments of the present disclosure.

FIG. 3 is a schematic diagram that focuses on the input domain of the TVF 400, and illustrates the boundaries of the TVF regions. The TVF 400 accepts values in a range between zero and $R_{max}$, the latter of which may represent the maximum possible flow rate into the computing device 110. For example, the computing device 110 may have a physical connection that is limited to a throughput of 100 Gbps, e.g., by technology or network policy.

The range [0, $R_{max}$] is divided into N regions of exponentially increasing size. In the example of FIG. 3, there are 1024 regions (i.e., N=1024) in particular. The upper boundaries of the regions can therefore be expressed in terms of exponents of a base value, a, (i.e., $a^0$, $a^1$, ..., $a^i$, ..., $a^{N-1}$). Correspondingly, $a = {}^{N-1}\sqrt{R_{max}}$. By expressing terms in this way, relatively smaller values may be used to compute the PV (i.e., the values of a and i) rather than a larger input throughput value between zero and $R_{max}$.

Figure 4:
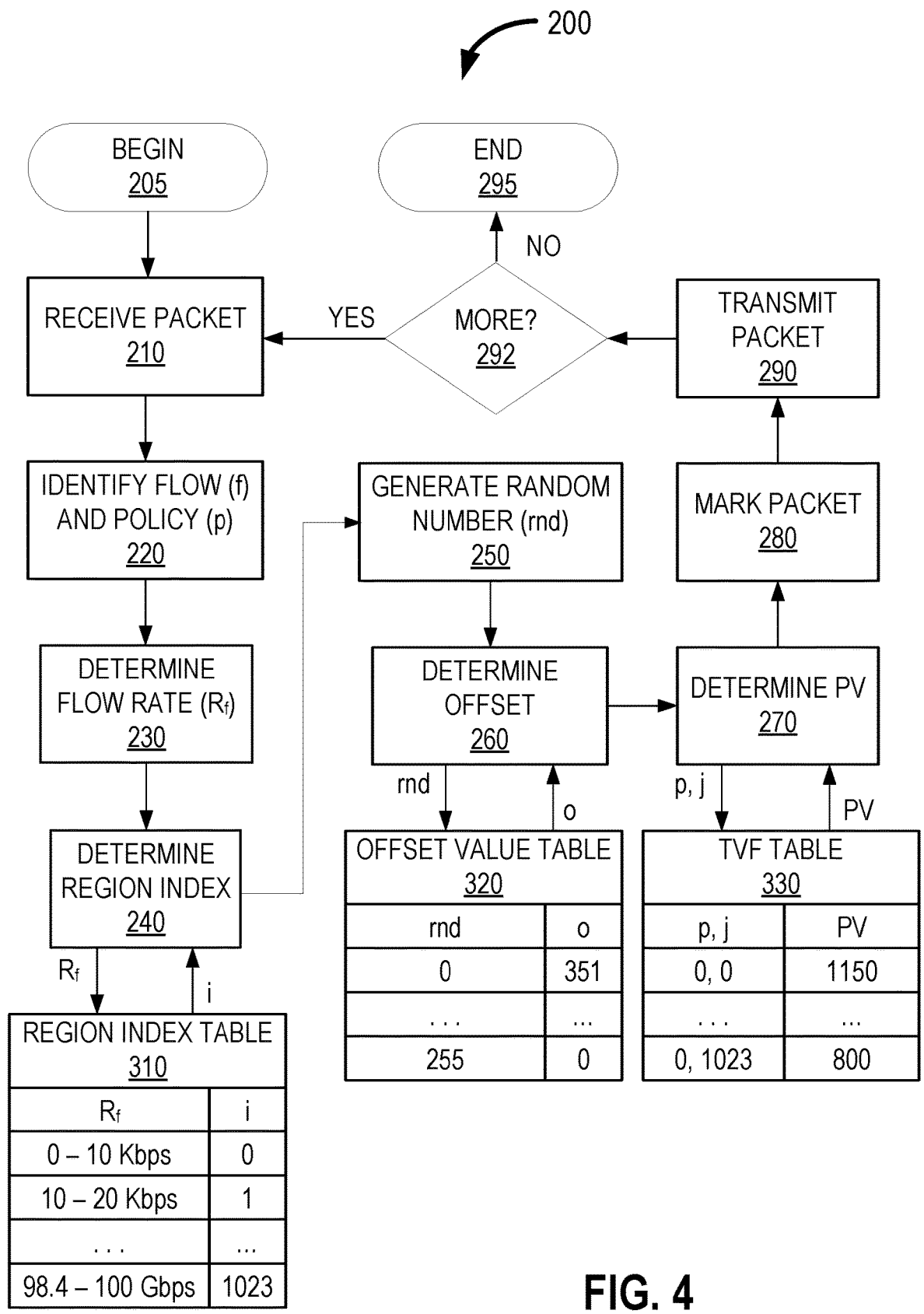
FIG. 4 is a flow diagram illustrating an example of packet processing, according to one or more embodiments of the present disclosure.

FIG. 4 is a flow diagram illustrating example packet processing 200 in which the values of a and i are used to determine PV values in accordance with a TVF 400 in a computationally efficient way and/or using widely supported operations. The packet processing 200 begins (block 205) when a packet is received (block 210). In response, the computing device 110 determines a flow identifier, f, and a policy identifier, p, of the flow to which the packet belongs (block 220). The policy identifier identifies a policy associated with a TVF 400 for marking packets associated with the flow identified by the flow identifier, f. The computing device 110 then determines a flow rate, $R_f$, for the flow f (step 230).

In some embodiments, the computing device 110 comprises processing circuitry configured to measure the flow rate of flow f. Based on the measured rate, the processing circuitry may further determine an estimated rate. For example, the processing circuitry may comprise low-pass filter components configured to compute the moving average of a plurality of measured flow rates. The determined flow rate $R_f$ may be the measured rate or the estimated rate, depending on the embodiment.

Figure 5:
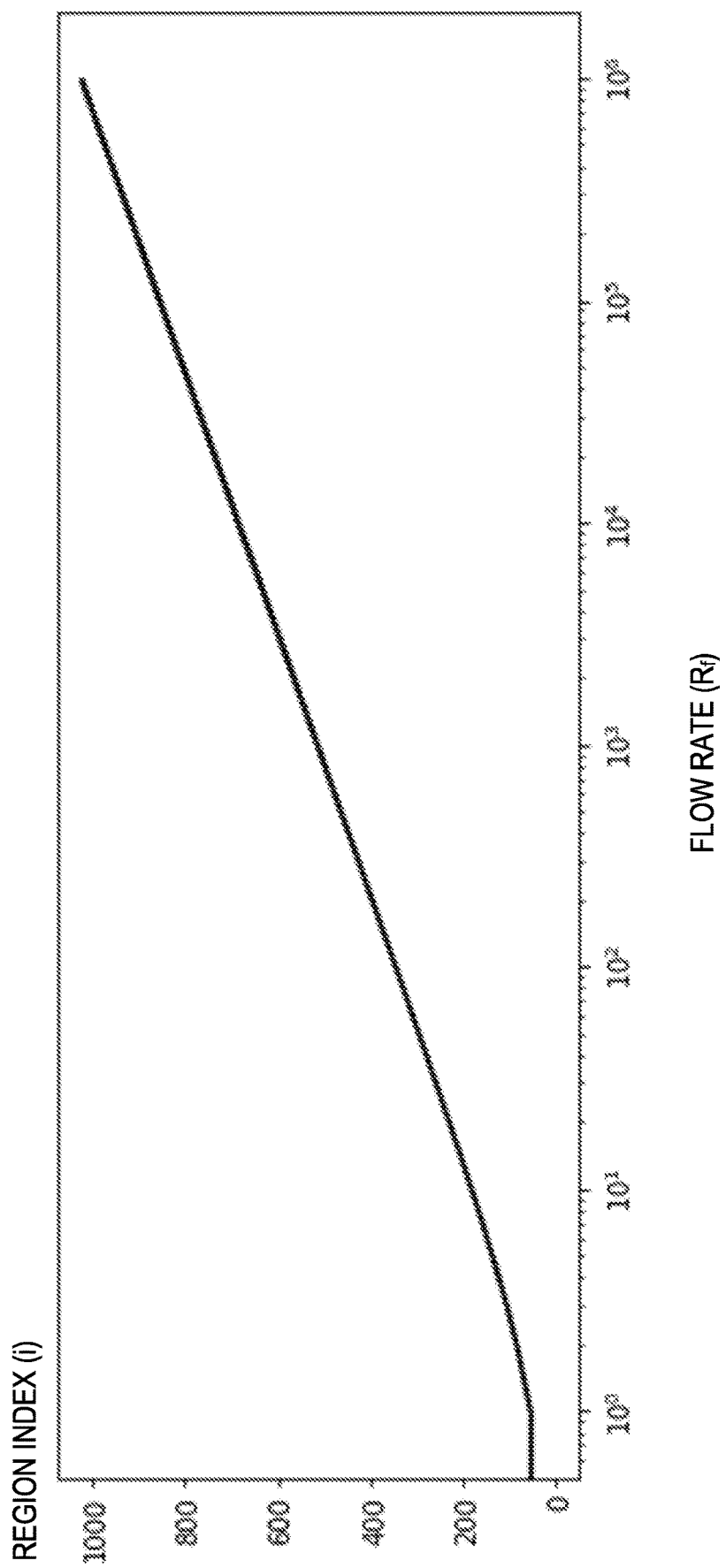
FIG. 5 is a graph illustrating an example relationship between flow rates and region indices, according to one or more embodiments of the present disclosure.

The computing device 110 then determines the index, i, of the region such that $a^{i-1} < R_f \leq a^i$ (i.e., the index of the region that has a lower boundary $a^{i-1}$ less than $R_f$ and an upper boundary $a^i$ greater than or equal to $R_f$). Although this could be performed by computing $\log_a(R_f)$, such an operation may not be available on the computing device 110 as discussed above. Accordingly, instead of a logarithm calculation, embodiments of the present disclosure use a region index table 310 to determine the index i based on the flow rate $R_f$. The region index table 310 maps ranges of acceptable throughputs to corresponding region indices (i.e., to values of i). FIG. 5 graphically illustrates an example of values of i obtained using corresponding flow rates Rt.

Returning to FIG. 4, having broadly identified a relevant region of the TVF 400 based on the flow rate $R_f$, as will be explained below, the computing device 110 takes further steps to hone in on a throughput value to use as input to the TVF in order to obtain a PV. Although traditional TVFs often rely on some amount of randomization to perform PPV marking (e.g., in order to facilitate in the marking of packets between flows), as previously discussed, many programmable switches only allow random number generation in ranges whose length is power of two: e.g., [0, $2^K-1$] where K is a positive integer. To avoid using a potentially unsupported random number generation operation, the computing device 110 uses this more limited random number generation approach. That is, the computing device 110 generates a random integer, rnd, from a range having a power of two (step 250). In this example, the computing device 110 generates a random number in the range [0, 255] (i.e., [0, $2^K-1$], wherein K=8). It should be noted that the term "random" as used in this disclosure does not require true random number generation, but should be considered to include pseudo-random number generation as well.

To approximate a random value between 0 and $R_f$ using the more limited random number, rnd, between 0 and $2^K-1$, the computing device 110 could, e.g., use the random number, rnd, to determine a fractional amount of the rate given by the upper boundary of region $a^i$. A straightforward approach to doing so would be to apply, to the upper boundary $a^i$, the ratio of (rnd+1) to $2^K$. That is, one way to determine a random rate $r_{rnd}$ between 0 and $R_f$ would be to use the formula $r_{rnd} = a^i \cdot ((rnd+1)/2^K)$. In this way, relatively higher values of rnd will result in values of $r_{rnd}$ that are relatively closer to $a^i$, whereas relatively smaller values of rnd will result in values $r_{rnd}$ that are relatively closer to zero.

However, as discussed above, certain operating environments may not support division (e.g., because division is generally considered to be a computationally expensive operation that might bog down the switch if used on a per-packet basis). In order to avoid potentially unsupported and relatively computationally expensive per-packet division operations, embodiments of the present disclosure use an offset value table 320 to determine an offset value, o, that is appropriate to remove from $a^i$ based on the random number rnd (block 260).

The offset value table 320 maps unique values of rnd to corresponding values of o. These offset values are preconfigured in the computing device 110. The offset value, o, obtained from the offset value table 320 based on the random number, rnd, is subtracted from the region index, i, to shift the region of interest from region i to region j. The upper boundary of j, namely $a^j$, is then used as an approximation of the randomized rate, $r_{rnd}$, as calculated using division as discussed above.

Figure 6:
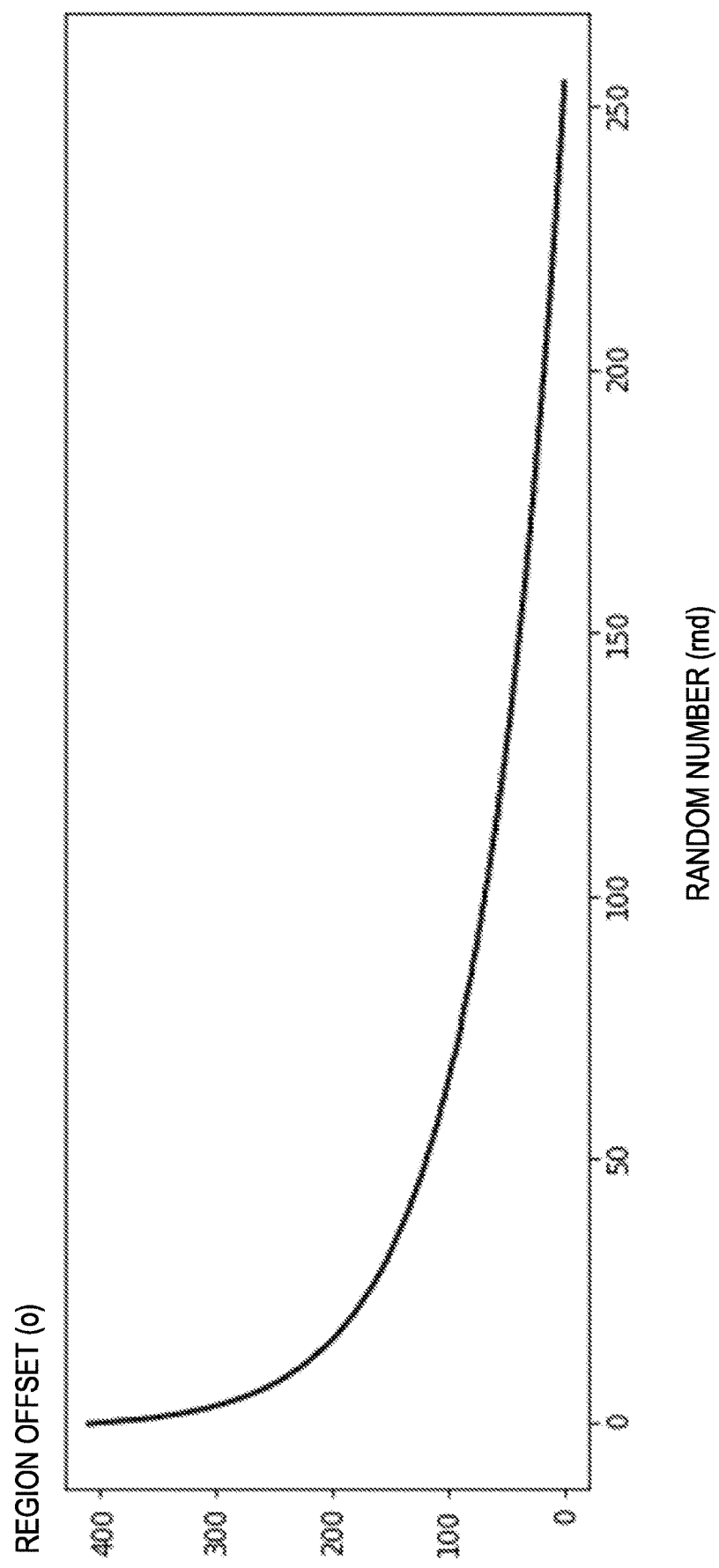
FIG. 6 is a graph illustrating an example relationship between offset values and random numbers, according to one or more embodiments of the present disclosure.

The values of o that are preconfigured in the offset value table 320 are values that are calculated using the formula $$-1\left(\log_{a^i} \frac{rnd+1}{2^K}\right),$$

and the value of j is determined according to j=i−o. As shown in FIG. 4, lower values of rnd produce higher offsets, which result in a lower value of j, whereas higher values of rnd produce smaller offsets, which result in higher values of j. Accordingly, the table effectively produces a value that approximates the determination of $r_{rnd}$ using division discussed above. FIG. 6 graphically illustrates an example of values of o obtained using corresponding random numbers rnd.

Figure 7:
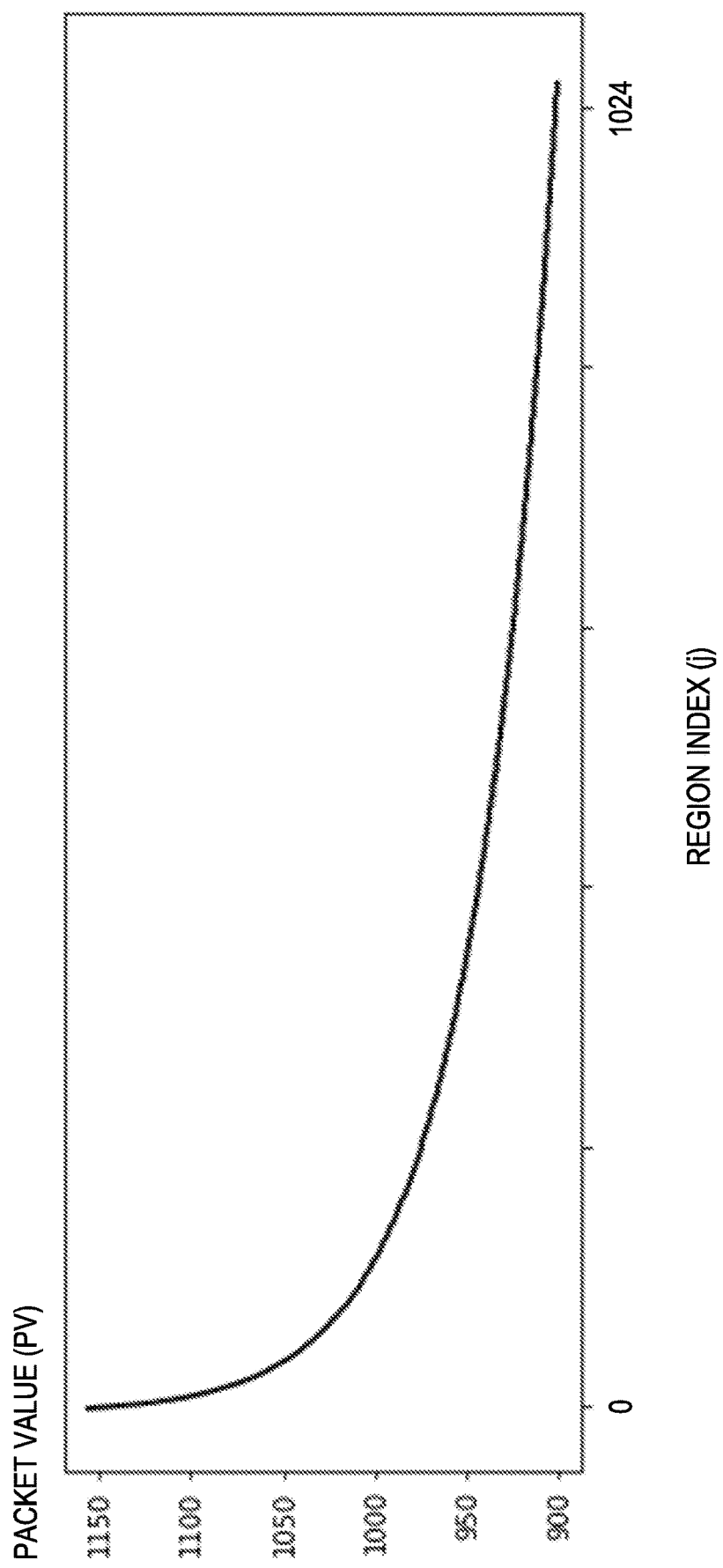
FIG. 7 is a graph illustrating an example relationship between PVs and regions, according to one or more embodiments of the present disclosure.

Returning to FIG. 4, the computing device 110 then determines a PV with which to mark the packet using the approximated random rate $a_j$ (block 270). To do so, the computing device 110 uses the value of $a^j$ as an input to the TVF 400 associated with policy identifier, p. To once again avoid complex computations, the TVFs 400 of the policies are implemented by one or more TVF tables 320. In this regard, a TVF table 320 maps the values of the region upper boundaries to PVs for at least one policy. In some embodiments, respective TVF tables 320 are used for the different policies (in one or more embodiments that include multiple policies). In the example of FIG. 4, a single TVF table 330 is used to store the PVs to be used for different combinations of policy and region boundary. FIG. 7 graphically illustrates an example of PVs obtained for different region indices j.

Returning to FIG. 4, the computing device 110 marks the packet with the PV (block 280) and transmits the marked packet (block 290). The computing device 110 may then continue processing one or more additional packets (block 292, yes path). Otherwise (block 292, no path) the packet processing 200 ends (block 295).

Figure 8:
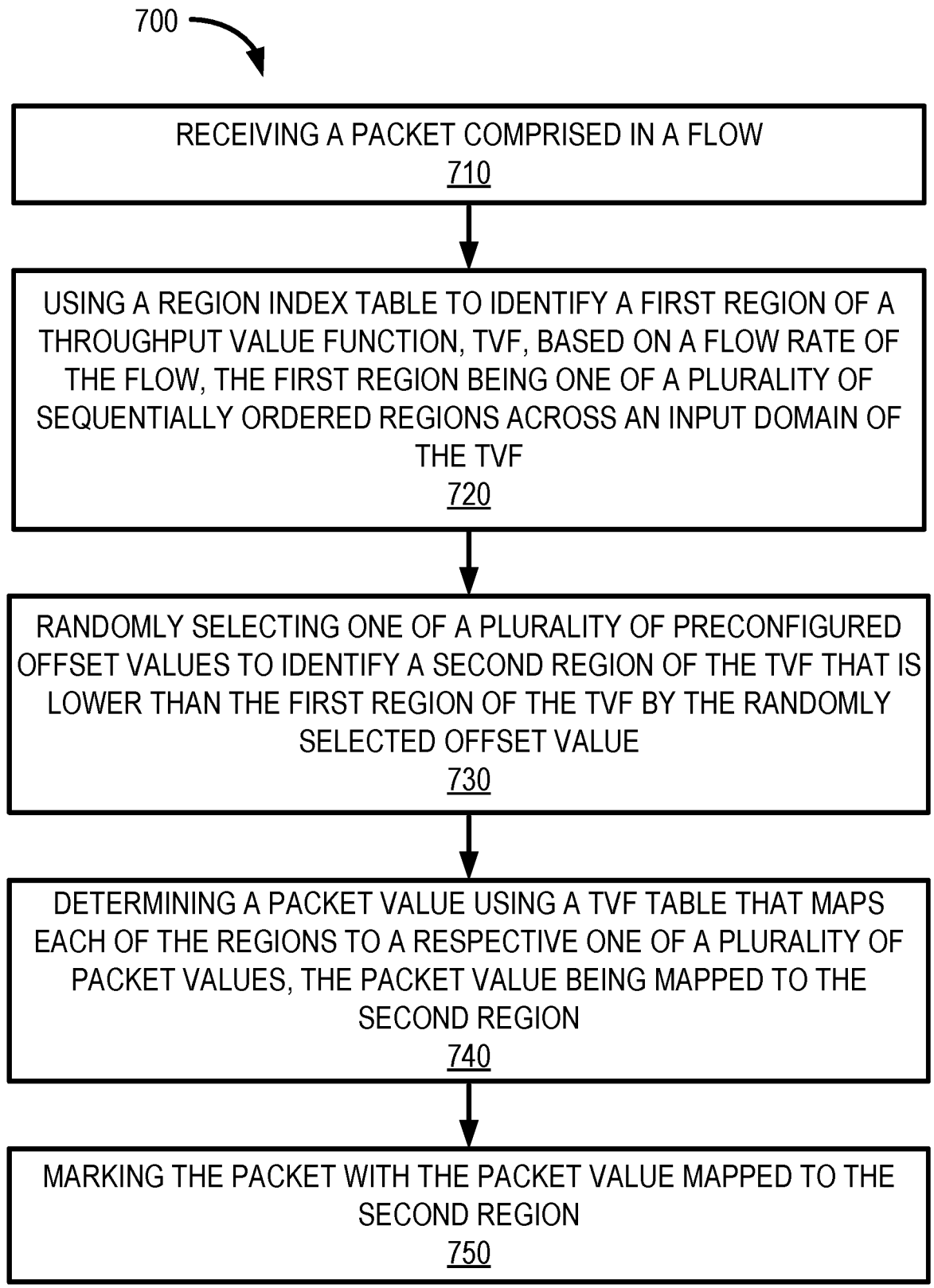
FIG. 8 is a flow diagram illustrating an example method implemented by a computing device, according to one or more embodiments of the present disclosure.

In view of all of the above, and as illustrated in the example of FIG. 8, particular embodiments of the present disclosure include a method 700 implemented by a computing device 110. The method 700 comprises receiving a packet comprised in a flow (block 710). The method 700 further comprises using a region index table 310 to identify a first region of a TVF 400 based on a flow rate of the flow (block 720). The first region is one of a plurality of sequentially ordered regions across an input domain of the TVF 400. The method 700 further comprises randomly selecting one of a plurality of preconfigured offset values to identify a second region of the TVF 400 that is lower than the first region of the TVF 400 by the randomly selected offset value (block 730). The method 700 further comprises determining a packet value using a TVF table (330) that maps each of the regions to a respective one of a plurality of packet values (block 740). The packet value is mapped to the second region. The method 700 further comprises marking the packet with the packet value mapped to the second region (block 750).

Other embodiments include a computing device 110. The computing device 110 may perform one, some, or all of the functions described above, depending on the embodiment. In particular, the computing device 110 may be configured to perform the method 500 illustrated in FIG. 8. In some embodiments, the computing device is further configured 110 to perform one or more of the packet processing features discussed above with reference to FIG. 4.

Figure 9:
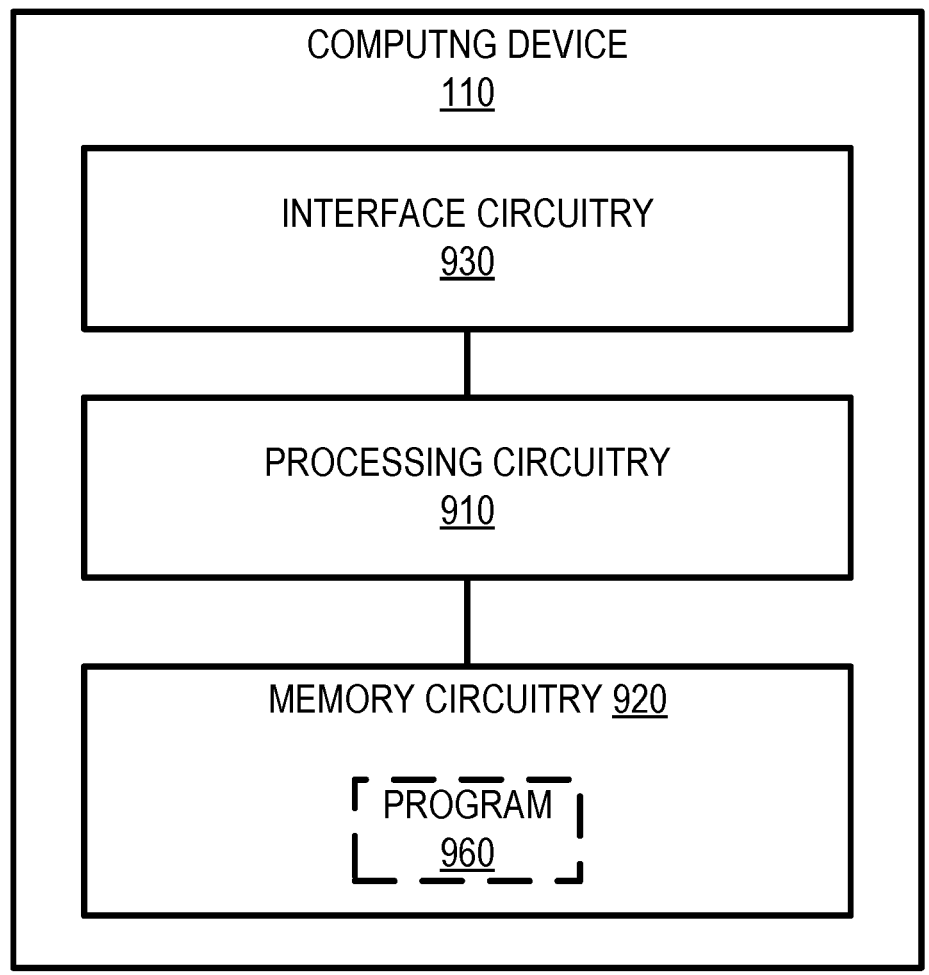
FIG. 9 is a schematic diagram illustrating an example computing device, according to one or more embodiments of the present disclosure.

In one example, the computing device 150 is implemented according to the hardware illustrated in FIG. 9. The example hardware of FIG. 9 comprises processing circuitry 910, memory circuitry 920, and interface circuitry 930. The processing circuitry 910 is communicatively coupled to the memory circuitry 920 and the interface circuitry 930, e.g., via one or more buses. The processing circuitry 910 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 910 may comprise a first processing circuit and a second processing circuit that are capable of executing functions in parallel.

The processing circuitry 910 may be programmable hardware capable of executing software instructions stored, e.g., as a machine-readable computer program 960 in the memory circuitry 920. The memory circuitry 920 may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The interface circuitry 930 may be a controller hub configured to control the input and output (I/O) data paths of the computing device 150. Such I/O data paths may include data paths for exchanging signals over a communications network 100. For example, the interface circuitry 930 may comprise one or more transceivers configured to send and receive communication signals over one or more packet-switched networks, cellular networks, and/or optical networks.

The interface circuitry 930 may be implemented as a unitary physical component, or as a plurality of physical components that are contiguously or separately arranged, any of which may be communicatively coupled to any other, or may communicate with any other via the processing circuitry 910. For example, the interface circuitry 930 may comprise output circuitry (e.g., transmitter circuitry configured to send communication signals over the communications network 100) and input circuitry (e.g., receiver circuitry configured to receive communication signals over the communications network 100). Other examples, permutations, and arrangements of the above and their equivalents will be readily apparent to those of ordinary skill.

According to embodiments of the hardware illustrated in FIG. 9, the processing circuitry 910 is configured to perform the method 700 illustrated in FIG. 8. That is, the processing circuitry 910 is configured to receive a packet comprised in a flow (e.g., via the interface circuitry 930). The processing circuitry 910 is further configured to use a region index table 310 to identify a first region of a TVF 400 based on a flow rate of the flow. The first region is one of a plurality of sequentially ordered regions across an input domain of the TVF 400. The processing circuitry 910 is further configured to randomly select one of a plurality of preconfigured offset values to identify a second region of the TVF 400 that is lower than the first region of the TVF 400 by the randomly selected offset value. The processing circuitry 910 is further configured to determine a packet value using a TVF table 330 that maps each of the regions to a respective one of a plurality of packet values. The packet value is mapped to the second region. The processing circuitry 910 is further configured to mark the packet with the packet value mapped to the second region.

In some embodiments, the processing circuitry 910 is further configured to perform one or more of the packet processing features discussed above with respect to FIG. 4. In this regard, the memory circuitry 920 may be configured to store the region index table 310, the offset value table 320, and/or the TVF table 330.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

We claim:

1. A method implemented by a computing device, the method comprising:
    receiving a packet comprised in a flow;
    using a region index table to identify a first region of a Throughput-Value Function (TVF) based on a flow rate of the flow, the first region being one of a plurality of sequentially ordered regions across an input domain of the TVF;
    randomly selecting one of a plurality of preconfigured offset values to identify a second region of the TVF that is lower than the first region of the TVF by the randomly selected offset value;
    determining a packet value using a TVF table that maps each of the regions to a respective one of a plurality of packet values, the packet value being mapped to the second region; and
    marking the packet with the packet value mapped to the second region.

2. The method of claim 1, wherein the region index table maps one or more flow rates to each of the regions of the TVF.

3. The method of claim 1, wherein:
    each of the preconfigured offset values is mapped by an offset value table to a respective unique value in a range of unique values; and
    randomly selecting the one of the plurality of preconfigured offset values comprises randomly selecting one of the unique values and using the randomly selected one of the unique values as an index into the offset value table to obtain the one of the plurality of preconfigured offset values.

4. The method of claim 3, wherein a cardinality of the range of unique values is a power of two.

5. The method of claim 1, wherein a maximum of the input domain of the TVF is a maximum supported throughput of a network via which the packet is received.

6. The method of claim 1, wherein the sequentially ordered regions are of exponentially increasing size.

7. The method of claim 1, wherein:
    the TVF table maps each of the regions to the respective one of the plurality of packet values for each of a plurality of policies; and
    the method further comprises identifying a policy in the plurality of policies associated with the flow for use in referencing the TVF table when determining the packet value.

8. The method of claim 1, wherein:
    the TVF table is one of a plurality of TVF tables, each of which is associated with a respective one of a plurality of policies; and
    the method further comprises identifying which of the plurality of TVF tables corresponds to a policy associated with the flow.

9. A computing device comprising:
    processing circuitry and a memory, the memory containing instructions executable by the processing circuitry whereby the computing device is configured to:
    receive a packet comprised in a flow;
    use a region index table to identify a first region of a Throughput-Value Function (TVF) based on a flow rate of the flow, the first region being one of a plurality of sequentially ordered regions across an input domain of the TVF;
    randomly select one of a plurality of preconfigured offset values to identify a second region of the TVF that is lower than the first region of the TVF by the randomly selected offset value;
    determine a packet value using a TVF table that maps each of the regions to a respective one of a plurality of packet values, the packet value being mapped to the second region; and
    mark the packet with the packet value mapped to the second region.

10. The computing device of claim 9, wherein the region index table maps one or more flow rates to each of the regions of the TVF.

11. The computing device of claim 9, wherein:
    each of the preconfigured offset values is mapped by an offset value table to a respective unique value in a range of unique values; and
    to randomly select the one of the plurality of preconfigured offset values the computing device is configured to randomly select one of the unique values and using the randomly selected one of the unique values as an index into the offset value table to obtain the one of the plurality of preconfigured offset values.

12. The computing device of claim 11, wherein a cardinality of the range of unique values is a power of two.

13. The computing device of claim 9, wherein a maximum of the input domain of the TVF is a maximum supported throughput of a network via which the packet is received.

14. The computing device of claim 9, wherein the sequentially ordered regions are of exponentially increasing size.

15. The computing device of claim 9, wherein:
    the TVF table maps each of the regions to the respective one of the plurality of packet values for each of a plurality of policies; and
    the computing device is further configured to identify a policy in the plurality of policies associated with the flow for use in referencing the TVF table when determining the packet value.

16. The computing device of claim 9, wherein:
    the TVF table is one of a plurality of TVF tables, each of which is associated with a respective one of a plurality of policies; and
    the computing device is further configured to identify which of the plurality of TVF tables corresponds to a policy associated with the flow.

17. A non-transitory computer readable medium storing a computer program product for controlling a computing device, the computer program product comprising software instructions that, when run on processing circuitry of the computing device, cause the computing device to:
    receive a packet comprised in a flow;
    use a region index table to identify a first region of a Throughput-Value Function (TVF) based on a flow rate of the flow, the first region being one of a plurality of sequentially ordered regions across an input domain of the TVF;

randomly select one of a plurality of preconfigured offset values to identify a second region of the TVF that is lower than the first region of the TVF by the randomly selected offset value;

determine a packet value using a TVF table that maps each of the regions to a respective one of a plurality of packet values, the packet value being mapped to the second region; and mark the packet with the packet value mapped to the second region.

\* \* \* \* \*